United States Patent [19]

Stalberg

[11] Patent Number: 5,643,465
[45] Date of Patent: Jul. 1, 1997

[54] PROCESS FOR REDUCING THE CONTENT OF HALOGEN-CONTAINING ORGANIC COMPOUNDS IN AQUEOUS SYSTEMS

[75] Inventor: Theo Stalberg, Monheim, Germany

[73] Assignee: Henkel Kommanditgesellschaft auf Aktien, Duesseldorf, Germany

[21] Appl. No.: 525,698

[22] PCT Filed: Mar. 15, 1994

[86] PCT No.: PCT/EP94/00808

§ 371 Date: Sep. 22, 1995

§ 102(e) Date: Sep. 22, 1995

[87] PCT Pub. No.: WO94/21564

PCT Pub. Date: Sep. 29, 1994

[30] Foreign Application Priority Data

Mar. 24, 1993 [DE] Germany .............. 43 09 468.6

[51] Int. Cl.⁶ .................................................. C02F 1/70
[52] U.S. Cl. ................... 210/757; 210/908; 210/909
[58] Field of Search ............................... 210/757, 908, 210/909

[56] References Cited

U.S. PATENT DOCUMENTS

| | | | |
|---|---|---|---|
| 4,212,735 | 7/1980 | Miller | 210/63 R |
| 4,351,978 | 9/1982 | Hatano et al. | 585/469 |
| 4,618,686 | 10/1986 | Boyer | 210/757 |
| 4,747,937 | 5/1988 | Hilfman et al. | 210/909 |
| 4,758,346 | 7/1988 | Johnson | 210/908 |
| 4,775,475 | 10/1988 | Johnson | 210/909 |
| 4,909,947 | 3/1990 | Johnson et al. | 210/737 |
| 5,051,030 | 9/1991 | Saka et al. | 210/757 |
| 5,352,335 | 10/1994 | Beaver | 210/908 |

FOREIGN PATENT DOCUMENTS 0563669 10/1993 European Pat. Off. .

OTHER PUBLICATIONS

Din 38 409 (Part 14).
Metalloberfläche 1990, 44 186–190, E. Oswald.
Pure & Appl. Chem. 1990, 62, 1145–1146.
Report PNL-6491-2; Order No. DE88-009535; April 1988: the document is available through NTIS –National Technical Information Service; United States Department of Commerce (document not enclosed).
Chem. Abstr. 110[12]: 101110f.
"Müll und Abfall" 1991, 23, 283–294.
Chem. Abstr. 110:81873b.
AIChE Journal 1992, 38 (No. 7), 1003–1012.
Chem. Abstr. 107 [20]: 182791s.

*Primary Examiner*—Neil McCarthy
*Attorney, Agent, or Firm*—Ernest G. Szoke; Wayne C. Jaeschke; Daniel S. Ortiz

[57] ABSTRACT

A process for reducing the amount of halogenated organic materials in aqueous systems by hydrogenating the halogenated organic materials in the aqueous system in the presence of ions of a metal from the 8th secondary group of the periodic system of elements at a pH of from 7 to 14 and a temperature of from 20° C. to 140° C.

20 Claims, No Drawings

PROCESS FOR REDUCING THE CONTENT OF HALOGEN-CONTAINING ORGANIC COMPOUNDS IN AQUEOUS SYSTEMS

FIELD OF THE INVENTION

This invention relates to a process for reducing the content of halogen-containing organic compounds in aqueous systems by reduction with hydrogen in the presence of a metal catalyst.

RELATED ART

AOX is the abbreviation for organic halogen compounds which are capable of being adsorbed onto active carbon (adsorbable organic (X) halogen compounds; X=fluorine, chlorine, bromine, iodine). The AOX value is determined in accordance with DIN 38409 (Part 14). Typical examples of AOX compounds are methylene chloride, trichloroethylene, perchloroethylene, chloroform, carbon tetrachloride and also PCB, HCH, DDT and chloroparaffins.

As a result of increasing environmental awareness, wastewater treatment is also acquiring increasing significance. AOX are undesirable in wastewaters on account of their chronic toxicity to human beings. In addition, AOX compounds are persistent and bioaccumulatable which leads to their accumulation in the environment. Accordingly, the AOX content of wastewaters in Germany is limited by legislative measures (cf. E. Oswald, "Metalloberfläche" 1990, 44, 186–190).

In a fairly recent synoptic article, E. Oswald (cf. "Metalloberfläche" 1990, 44, 186–190) names three particularly important processes for the chemical treatment of AOX-containing wastewaters, namely:

a) treatment with ozone, b) treatment with ultraviolet radiation and $H_2O_2$, c) oxidizing or reducing electrolytic treatment.

These processes are essentially oxidative processes. A variant of the oxidative processes has been described by J. K. Beattie. In this variant, organochlorine compounds are degraded with ruthenium tetroxide in aqueous medium to form carbonate and chloride (cf. Pure & Appl. Chem. 1990, 62, 1145–1146).

According to R. A. Miller, organic compounds, such as 1,3,5-trichlorobenzene, can be oxidized in aqueous medium at an acidic pH value which should be no more than 4 (cf. U.S. Pat. No. 4,212,735). Air, for example, may be used as the oxidizing agent. Miller proposes a ternary combination of nitrate ions, bromide and/or iodide ions and also transition metal ions of at least one transition metal with two or more oxidation numbers as a characteristic co-catalyst system. The preferred pH range is below 1 while the preferred temperature is above 150° C.

In addition, reducing processes have also been described in the literature. According to K. H. Sweeny, persistent organic compounds, such as halogenated pesticides, can be removed from aqueous systems by allowing the solutions to flow through a column containing a reducing metal catalyst, such as Fe-Cu, at or in the vicinity of the neutral point.

E. G. Baker and L. J. Sealock describe the catalytic decomposition of chlorinated organic compounds in aqueous solution (cf. Report PNL-6491-2; Order No. DE88-009535; April 1988; the document is available through NTIS—National Technical Information Service; United States Department of Commerce; cf. also the abstract in Chem. Abstr. 110[12]:101110f). The Baker/Sealock process comprises treating the wastewaters with transition metal catalysts at temperatures of 300° to 400° C. and under high pressures. Unfortunately, it is attended by the disadvantage that it requires very drastic conditions in regard to temperature and pressure. In addition, the authors describe reduced nickel as the only effective catalyst so that the general usefulness of other transition metal catalysts appears highly questionable.

In a review, G. Dehoust, C. Ewen and R. Gensicke describe organohalogen-containing waste as problematical waste in waste management (cf. "Müll und Abfall" 1991, 23, 283–294). They mention hydrogenation as one method of treating waste containing organohalogen compounds. This method is based on the principle of reacting the chlorine formed during the hydrogenation of organo-halogen-containing waste to form hydrogen chloride. Bromine-, flourine- or iodine-containing waste behaves in the same way. The reaction may be schematized as follows:

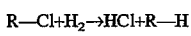

R—Cl+$H_2$→HCl+R—H    (Scheme 1)

In scheme 1, R—Cl represents an organic chlorine compound, $H_2$ represents hydrogen, HCl represents hydrogen chloride and R—H represents a hydrocarbon.

There are essentially two variants of the hydrogenation process. Thermal hydrogenation, also known as thermocracking, is carried out at temperatures of 700° to 1,400° C. So-called catalytic hydrogenation is carried out in the presence of solid catalysts. Accordingly, the article by G. Dehoust et al. draws the attention of the expert to the basic possibility of using the process of catalytic hydrogenation to treat halogen-containing organic waste. However, there is no reference in the article by G. Dehoust et al. to the extent to which catalytic hydrogenation might also be suitable for reducing the AOX content of AOX-containing wastewaters. The same applies to the general references provided, for example, by T. Mathe et al., according to which polychlorinated halogen compounds can be dehydrochlorinated in the presence of palladium catalysts (cf. Chem. Abstr. 110 [10]:81873b).

In fairly recent studies, S. Kovenklioglu et al. have found that dehydrochlorination can be carried out with palladium on carbon as catalyst in aqueous systems containing chlorinated hydrocarbons, such as 1,1,2-trichloroethane (cf. AIChE Journal 1992, 38 (No. 7), 1003–1012). The authors conducted their catalyst screening in a shaker autoclave at room temperature and in the vicinity of atmospheric pressure. They found that the dehydrochlorination proceeds far more sluggishly with the Pd/$Al_2O_3$ system than with the Pd/C system because the halogen-containing educt is adsorbed more poorly by aluminium oxide. In this connection, they point out specifically that the presence of carbon is crucial to the success of the dehydrochlorination (loc. cit., page 1003). However, the process of S. Kovenklioglu et al. has two disadvantages, namely: on the one hand, the dehydrochlorinations were carried out in deionized water which is unrealistic from the practical point of view, i.e. for reducing the AOX content of a wastewater; on the other hand, S. Kovenklioglu et al. teach the expert that the presence of carbon, i.e. a support which adsorbs the halogen-containing hydrocarbon, is crucial to the success of their process.

Finally, J. M. Harden and G. G. Ramsey teach catalytic dehydrohalogenation with a mixture of a strong base and polyethylene glycol (cf. Chem. Abstr. 107 [20]:182791s).

BRIEF DESCRIPTION OF THE INVENTION

The methods known from the prior art appear extremely heterogeneous on the whole and are mainly designed for individual cases. In view of the considerable topicality of wastewaters, therefore, there is a constant need for alternative processes for reducing the AOX content of wastewaters.

It has now surprisingly been found that the AOX content of corresponding aqueous systems can be reduced to the high degree required by reduction with hydrogen in the presence of a metal ion catalyst and at a pH value in the range from 7 to 14. In the context of the present invention, a metal ion catalyst is understood to be a catalyst in which the oxidation number of the metal is different from 0.

Accordingly, the present invention relates to a process for reducing the content of halogen-containing organic compounds (AOX) in aqueous systems by reduction with hydrogen in the presence of a metal ion catalyst, characterized in that i) the oxidation number of the metal of the metal ion catalyst is different from 0 and in that the reduction is carried out ii) at a pH value in the range from 7 to 14 and iii) at a catalyst concentration of 0.001 to 5% by weight, based on the aqueous system as a whole.

DETAILED DESCRIPTION OF THE INVENTION

The process according to the invention is not subject to any particular limitations in regard to the AOX content of the wastewater. So far as wastewaters of practical relevance are concerned, however, it is pointed out that the process according to the invention is particularly suitable for any aqueous systems with an AOX content in the range from 0.1 to 10,000 ppm.

In one preferred embodiment of the process according to the invention, the reduction with hydrogen, also referred to hereinafter as hydrogenation, is carried out at a pH value of 9 to 13.

Basically, the choice of the hydrogenation temperature is not subject to any particular limitations in the process according to the invention. In one preferred embodiment, however, the hydrogenation is carried out at a temperature in the range from 20° to 140° C., temperatures in the range from 60° to 120° C. being particularly preferred.

The process is normally carried out by adding the catalyst to the AOX-containing wastewater in a quantity of 0.001 to 5% by weight, based on the aqueous system as a whole, establishing the required pH value and then carrying out the hydrogenation. The hydrogenation may be carried out in batches. However, it may also be carried out in a continuous reactor with a fixed-bed catalyst. This particular embodiment of the process according to the invention is preferred in particular in view of the fact that the process according to the invention provides favorable results, i.e. a distinct reduction in the AOX content, even with very short reaction times of the order of a few minutes. This is another advantage of the process.

In a preferred embodiment of the invention, the metal on which the metal ion catalyst is based is selected from the 8th secondary group of the periodic system of elements (iron, cobalt, nickel, ruthenium, rhodium, palladium, osmium, iridium, platinum). Ruthenium is most particularly preferred.

The following Examples are intended to illustrate the invention without limiting it in any way.

EXAMPLES

Origin of the wastewater 62 g of sclareol and 1.9 g of an adduct of 20 moles of ethylene oxide with tallow fatty alcohol ("Dehydol TA 20", a product of Henkel KGaA, Düsseldorf) were introduced into 350 ml of water and heated with stirring to 80° C. The dispersion was allowed to cool to 35°–40° C., after which 0.83 g of ruthenium trichloride (25% solution, a product of Degussa AG) and 112.5 g of a 50% aqueous KOH solution were added. 1862.5 g of a 13% aqueous sodium hypochlorite solution were then introduced with stirring over a period of 3 hours. After the NaOCl had been added, the reaction mixture was stirred overnight, cooling to room temperature in the process.

For working up, 195 ml of a 20% aqueous solution of sodium sulfite were added to the aqueous mixture to destroy the oxidizing agent (sodium hypochlorite). After stirring for 15 minutes at 20° C., the mixture was acidified by addition of 300 ml of a 40% sulfuric acid. Finally, the organic phase was separated from the aqueous phase.

The aqueous phase thus obtained is hereinafter referred to as wastewater I. It still contains the ruthenium emanating from the oxidation of sclareol as described above. The AOX content of the wastewater I as determined in accordance with DIN 38409 (Part 14) was 74 ppm.

Example 1 (E-1)

The (ruthenium-containing) wastewater I was adjusted with alkali to a pH value of 7.0 and then reacted in an autoclave at 100° C. under a hydrogen pressure of 10 bar. After 120 minutes, the AOX content was 2.4 ppm (cf. Table 1).

Examples 2 and 3 (E-2 and E-3)

Example 1 was repeated with changes to the pH value and the reaction time. Particulars can be found in Table 1.

Comparison Example 1 (C-1)

Example 1 was repeated at a pH value of 3.0, i.e. at a pH value outside the range claimed in accordance with the invention. The AOX content was now found to be 5.1 ppm. The parameters on which this comparison is based are also set out in Table 1.

TABLE 1

Treatment of wastewater I

| Ex. | Catalyst added[2] | ph value | Temp. (°C.) | Time (mins.) | AOX[1] (ppm) |
|---|---|---|---|---|---|
| E-1 | — | 7.0 | 100 | 120 | 2.4 |
| E-2 | — | 12.3 | 100 | 120 | 0.1 |
| E-3 | — | 12.3 | 120 | 15 | 0.6 |
| C-1 | — | 3.0 | 100 | 120 | 5.1 |

[1] The AOX values were determined in accordance with DIN 38409 (Part 14)
[2] As can be seen from the foregoing Examples, the catalyst used here was already present in the system from the preceding oxidation of sclareol.

Discussion of the test results

It can clearly be seen that the AOX content was very considerably reduced in Examples E-1 to E-3 according to the invention. Comparison of Examples E-2 and C-1 shows in particular that the pH value is a critical parameter. Whereas the AOX content is reduced to a value of 5.1 ppm at a pH value of 3.0, i.e. in acidic medium, it is only 0.1 ppm, i.e. lower by a factor of 50, at a pH value of 12.5, i.e. in alkaline medium.

We claim:

1. A process for reducing the content of halogen containing organic compounds in an aqueous system which comprises: contacting the aqueous system containing halogen containing organic compounds and from 0.001 to 5 percent by weight of the aqueous system, of at least one metal ion catalyst with an oxidation number which is not zero, with hydrogen, at a pH of from 7 to 14.

2. The process as claimed in claim 1 wherein the pH is from 9 to 13.

3. The process as claimed in claim 1 wherein the content of halogen containing organic compounds in the aqueous system is from 0.1 to 10,000 ppm.

4. The process as claimed in claim 1 wherein the process is carried out at a temperature of from 20° C. to 140° C.

5. The process as claimed in claim 1 wherein the process is carried out in a continuous reaction zone.

6. The process as claimed in claim 1 wherein the metal ion catalyst comprises ions of at least one metal selected from the group consisting of the 8th secondary group of the periodic system of elements.

7. The process as claimed in claim 1 wherein the metal ion catalyst comprises ruthenium.

8. The process of claim 2 wherein the content of halogen containing organic compounds in the aqueous system is from 0.1 to 10,000 ppm.

9. The process of claim 2 wherein the aqueous system is contacted with hydrogen at a temperature of from 20° C. to 140° C.

10. The process of claim 2 wherein the process is carried out in a continuous reaction zone.

11. The process of claim 2 wherein the catalyst comprises ions of at least one metal selected from the group consisting of iron, cobalt, nickel, ruthenium, rhodium, palladium, osmium, iridium and platinum.

12. The process of claim 2 wherein the metal ion catalyst comprises ruthenium.

13. The process of claim 3 wherein the aqueous system is contacted with hydrogen at a temperature from 20° C. to 140° C.

14. The process of claim 3 wherein the process is carried out in a continuous reaction zone.

15. The process of claim 3 wherein the metal ion catalyst comprises ions of at least one metal selected from the group consisting of the 8th secondary group of the periodic system of elements.

16. The process of claim 3 wherein the metal ion catalyst comprises ruthenium.

17. The process of claim 4 wherein the metal ion catalyst comprises ions of at least one metal selected from the group consisting of the 8th secondary group of the system of elements.

18. The process of claim 4 wherein the metal ion catalyst comprises ruthenium.

19. The process of claim 4 wherein the temperature is from 60° C. to 120° C.

20. The process of claim 9 wherein the temperature is from 60° C. to 120° C.

* * * * *